(12) United States Patent
Kallay et al.

(10) Patent No.: US 9,043,186 B2
(45) Date of Patent: May 26, 2015

(54) SURFACE NORMAL COMPUTATION ON NOISY SAMPLE OF POINTS

(75) Inventors: Michael Kallay, Bellevue, WA (US); Simon A. J. Winder, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 686 days.

(21) Appl. No.: 13/314,213

(22) Filed: Dec. 8, 2011

(65) Prior Publication Data

US 2013/0151210 A1 Jun. 13, 2013

(51) Int. Cl.
*G06F 7/60* (2006.01)
*G06T 7/00* (2006.01)

(52) U.S. Cl.
CPC ........... *G06T 7/0051* (2013.01); *G06T 2200/04* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 5,283,837 A | 2/1994 | Wood | |
| 6,377,865 B1 | 4/2002 | Edelsbrunner et al. | |
| 6,888,960 B2 | 5/2005 | Penev et al. | |
| 6,968,299 B1 | 11/2005 | Bernardini et al. | |
| 7,319,467 B2 | 1/2008 | Weyrich et al. | |
| 2001/0022653 A1* | 9/2001 | Seo | 356/5.01 |
| 2004/0217956 A1 | 11/2004 | Besl et al. | |
| 2006/0269896 A1* | 11/2006 | Liu et al. | 433/29 |
| 2011/0082667 A1 | 4/2011 | Ibarz et al. | |

OTHER PUBLICATIONS

"Computation of Surface Energies in an Electrostatic Point Charge Model: I. Theory" Woensdregt, C.F. © Springer-Verlag 1992.*
"Aspects of tactile probing on the micro scale", Bos, E.J.C. © 2010 Elsevier Inc.*
Fabio, Remondino, "From Point Cloud to Surface: The Modeling and Visualization Problem", Retrieved at <<http://citeseerx.ist.psu.edu/viewdoc/download?doi=10.1.1.115.9606&rep=rep1&type=pdf>>, International Archives of the Photogrammetry, Remote Sensing and Spatial information Sciences, International Workshop on Visualization and Animation of Reality-based 3D Models, vol. XXXIV-5/W10, Feb. 2003, pp. 1-11.

* cited by examiner

*Primary Examiner* — Omar Fernandez Rivas
*Assistant Examiner* — Nithya J Moll
(74) *Attorney, Agent, or Firm* — Steve Wight; Judy Yee; Micky Minhas

(57) ABSTRACT

Various technologies described herein pertain to computing surface normals for points in a point cloud. The point cloud is representative of a measured surface of a physical object. A point in the point cloud can be set as a point of origin, and points in the point cloud can be modeled as electrostatic point charges. Moreover, a point of least electrostatic potential on a sphere centered at the point of origin can be computed as a function of the electrostatic point charges. Further, unit vector with a direction from the point of origin to the point of least electrostatic potential on the sphere can be assigned as a normal for the point of origin.

20 Claims, 7 Drawing Sheets

SURFACE NORMAL COMPUTATION ON NOISY SAMPLE OF POINTS

BACKGROUND

Surfaces of physical objects are commonly scanned to generate point clouds. A point cloud, for instance, can include points (e.g., vertices) in a three-dimensional coordinate system. According to an example, points included in a point cloud can be defined by x, y, and z coordinates. Points in a point cloud typically represent a measured surface of a physical object (e.g., external surface of the physical object).

A point cloud oftentimes is generated by a device such as a laser scanner, a camera, etc. The device can measure a large number of points on the surface of the physical object. However, imprecision of the device that measures the surface of the physical object can introduce random noise into the data included in the point cloud.

Various applications can reconstruct and/or render a surface implied by a sample of points included in a point cloud. As part of reconstruction and/or rendering the implied surface, a surface normal, i.e. a vector that is approximately perpendicular to the implied surface at a point in the point cloud, is oftentimes computed and assigned to such point. For example, respective normals are typically computed and assigned to each point in the point cloud. However, conventional techniques for computing normals, such as principal component analysis (PCA), are oftentimes prone to error in the presence of noise. Thus, noise introduced by devices used to generate point clouds, as well as noise introduced into the point clouds by substantially any other sources, can detrimentally impact conventional techniques for computing surface normals, which can adversely affect reconstruction and/or rendering of surfaces implied by the point clouds.

SUMMARY

Described herein are various technologies that pertain to computing surface normals for points in a point cloud. The point cloud is representative of a measured surface of a physical object. A point in the point cloud can be set as a point of origin, and points in the point cloud can be modeled as electrostatic point charges. Moreover, a point of least electrostatic potential on a sphere centered at the point of origin can be computed as a function of the electrostatic point charges. Further, unit vector with a direction from the point of origin to the point of least electrostatic potential on the sphere can be assigned as a normal for the point of origin.

According to various embodiments, a subset of the points in the point cloud that neighbor the point of origin can be identified. Further, the point of least electrostatic potential on a sphere centered at the point of origin can be computed based on the subset of the points that neighbor the point of origin. By way of example, points in the point cloud positioned less than a predetermined distance from the point of origin can be identified as being the subset of the points in the point cloud that neighbor the point of origin. Pursuant to another example, points in the point cloud positioned less than a sampled neighborhood distance from the point of origin can be identified as being the subset of points in the point cloud that neighbor the point of origin, where the sampled neighborhood distance is determined from statistics of the point cloud.

Further, a length of a radius of the sphere centered at the point of origin can be set to control a tradeoff between noise reduction and feature preservation. In various embodiments, the length of the radius can be predefined. In other embodiments, the length of the radius can be determined to provide that the sphere encloses a target number of points.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
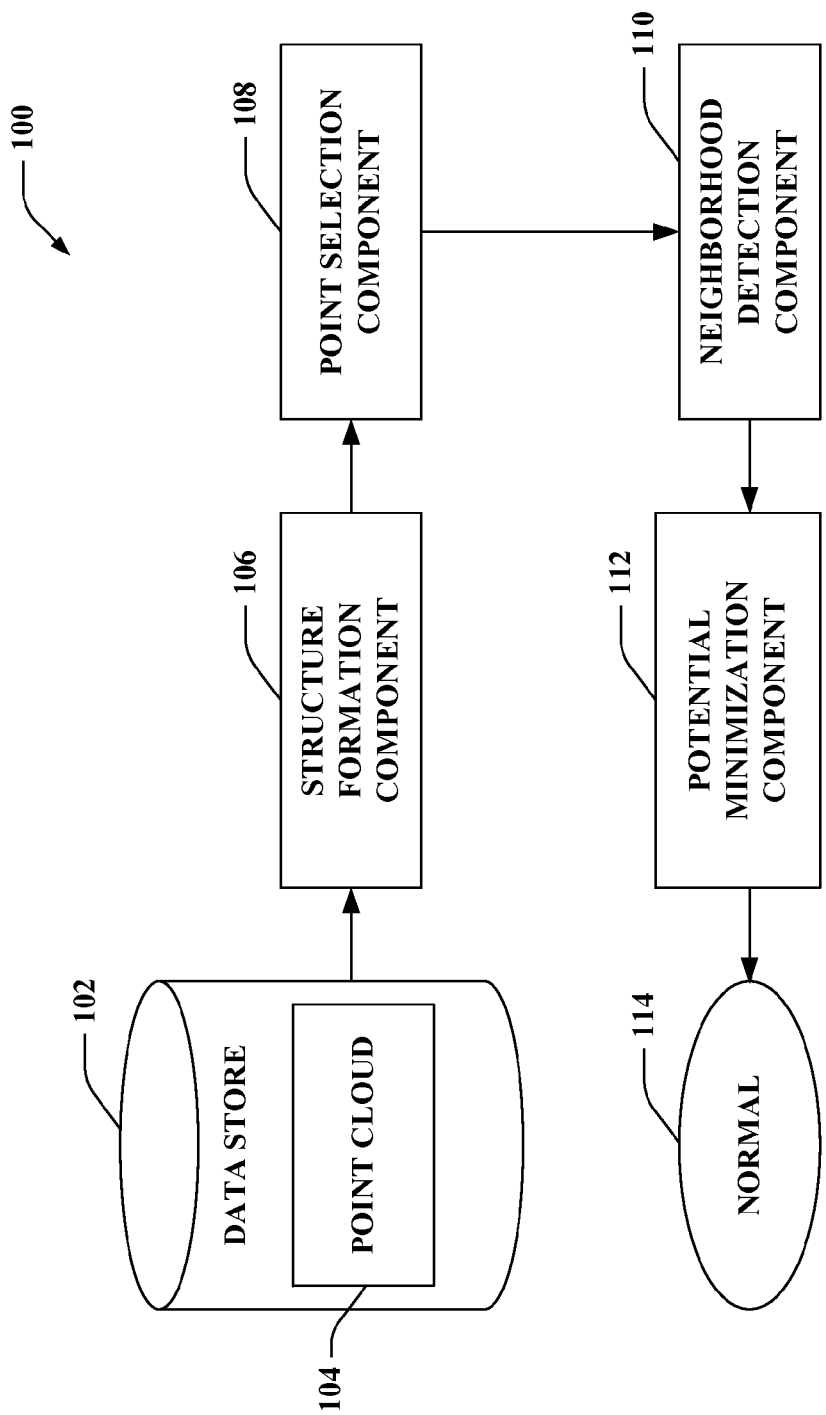
FIG. 1 illustrates a functional block diagram of an exemplary system that computes surface normals based on an electrostatic potential analysis.

Various technologies pertaining to computing surface normals on a noisy sample of points are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, surface normals can be computed by modeling points in a point cloud as electrostatic point charges. When determining a normal for a given point (referred to herein as a point of origin) in the point cloud, an electrostatic potential on a sphere centered at the point of origin can be evaluated. More particularly, a point of least electrostatic potential on the sphere centered at the point of origin due to the electrostatic point charges can be computed. Further, a direction from the point of origin to the point of least electrostatic potential on the sphere can be assigned as the normal for the point of origin. Moreover, normals for other points in the point cloud can be similarly determined (e.g., by computing respective points of least electrostatic potential on respective spheres centered at the other points and assigning directions between the other points and the respective points of least electrostatic potential as respective normals).

Referring now to the drawings, FIG. 1 illustrates a system 100 that computes surface normals based on an electrostatic potential analysis. The system 100 includes a computer-readable data store 102 that can retain a point cloud 104. The point cloud 104 is representative of a measured surface of a physical object. The point cloud 104 can include points in a three dimensional coordinate system (e.g., the point cloud 104 can be a set of points defined by x, y, and z coordinates). For example, the point cloud 104 can be generated by a device such as a laser scanner, camera, etc., which can sample a surface of a physical object to obtain the points of the point cloud 104. Moreover, the system 100 can determine normals for the points in the point cloud 104.

The system 100 can optionally include a structure formation component 106 that can organize the point cloud 104 in a data structure retained in the data store 102. The data structure can support fast retrieval of points that neighbor a particular point; thus, the data structure can be amenable to location-based searches. For example, points within a given distance of the particular point or a preset number of points that are positioned closest to the particular point can be rapidly located from the point cloud 104 when organized in the data structure. The structure formation component 106 can build substantially any type of data structure that includes the point cloud 104. According to an example, the structure formation component 106 can organize the point cloud 104 in a spatial data partitioning tree (e.g., R-tree). By way of another example, the structure formation component 106 can organize the point cloud 104 in a binary space partitioning tree (e.g., k-d tree). Pursuant to yet another example, the structure formation component 106 can organize the point cloud 104 in a spatial hash. It is to be appreciated, however, that the claimed subject matter is not limited to the foregoing examples.

The system 100 can independently compute respective normals for the points in the point cloud 104. Accordingly, the system 100 includes a point selection component 108 that sets one of the points in the point cloud 104 as a point of origin. The point of origin is a point for which a normal is computed and assigned. Further, since the system 100 can determine respective normals for the points in the point cloud 104, each point in the point cloud 104 can be chosen as a point of origin by the point selection component 108 to compute and assign a normal thereto. In various embodiments, a respective normal can be computed for each point in the point cloud 104. In other embodiments, a respective normal can be computed for a subset of the points in the point cloud 104.

In various embodiments, a normal can be computed and assigned to a first point in the point cloud 104 set as a point of origin by the point selection component 108, thereafter a normal can be computed and assigned to a second point in the point cloud 104 set as a point of origin by the point selection component 108, and so forth (e.g., for each point in the point cloud 104, for the subset of the points in the point cloud 104 for which respective normals are computed, etc.). Thus, for instance, upon computing and assigning the normal to the first point, the point selection component 108 can set the second point as the point of origin, and so forth. In other embodiments, the point selection component 108 can concurrently set more than one point in the point cloud 104 as points of origins, and respective normals can be concurrently and independently computed and assigned thereto. Moreover, it is to be appreciated that a combination of the foregoing can be employed by the system 100.

The system 100 further includes a neighborhood detection component 110 that identifies a subset of the points in the point cloud 104 that neighbor the point of origin set by the point selection component 108. The subset of the points in the point cloud 104 that neighbor the point of origin are also referred to herein as neighbor points. For example, the neighborhood detection component 110 can use the data structure to compile a list of neighbor points from the point cloud 104; thus, the subset of the points in the point cloud 104 that neighbor the point of origin can be identified by the neighborhood detection component 110 using the data structure retained in the data store 102. Yet, it is to be appreciated that the claimed subject matter is not limited to the foregoing example. The subset of the points in the point cloud 104 that neighbor the point of origin can be identified from the point cloud 104 by the neighborhood detection component 110 to enable the normal for the point of origin to be computed based on a limited number of neighboring points rather than the entire point cloud 104, thereby enhancing efficiency of the system 100.

In various embodiments, points in the point cloud 104 that are positioned less than a predetermined distance from the point of origin can be recognized as neighboring the point of origin. Thus, the neighborhood detection component 110 can detect the subset of points in the point cloud 104 positioned less than the predetermined distance from the point of origin.

In other embodiments, a preset number of points in the point cloud 104 that are positioned nearest to the point of origin can be identified as neighboring the point of origin. Accordingly, the neighborhood detection component 110 can detect the preset number of the points in the point cloud 104 positioned at shortest distances from the point of origin as being the subset of the points in the point cloud 104 that neighbor the point of origin.

In yet other embodiments, an approximate number of points in the point cloud 104 that are positioned less than a sampled neighborhood distance from the point of origin can be detected as neighboring the point of origin. Hence, the neighborhood detection component 110 can detect the approximate number of the points in the point cloud 104 positioned less than the sampled neighborhood distance from the point of origin.

According to an example, the sampled neighborhood distance can be determined by the neighborhood detection component 110 from statistics of the point cloud 104; however, it is also contemplated that a disparate component (not shown) can compute the sampled neighborhood distance. Following this example, the neighborhood detection component 110 can randomly select sample points from the point cloud 104. Further, the neighborhood detection component 110 can identify respective sizes of spheres centered at the sample points that enclose a desired number of points of the point cloud 104 (e.g., the desired number of points can be 100 points, an integer less than 100, an integer greater than 100). For instance, the data structure built by the structure formation component 106 can be repeatedly queried using spheres of different sizes centered on a given sample point to find a size of a sphere that encloses the desired number of points of the point cloud 104. Moreover, the neighborhood detection component 110 can compute the sampled neighborhood distance from the respective sizes of the spheres. By way of illustration, a list of radiuses of the respective sizes of the spheres centered at the sample points can be formed, and the neighborhood detection component 110 can calculate a statistic (e.g., median, mean, maximum, minimum, mode, etc.) from the list of radiuses, where the statistic is the sampled neighborhood distance. The sampled neighborhood distance can be used by the neighborhood detection component 110 to detect respective neighbor points for each point of origin chosen by the point selection component 108 from the point cloud 104.

Moreover, the system 100 includes a potential minimization component 112 that models points in the point cloud 104 as electrostatic point charges. An electrostatic point charge can be a point particle with a nonzero electrostatic charge located at a point (e.g., defined by an x, y, z coordinate) in the point cloud 104. The electrostatic point charges can be modeled as having substantially similar values (e.g., substantially similar nonzero charges), for example. By way of another example, it is contemplated that two or more of the electrostatic point charges can have different values (e.g., different nonzero charges). Further, the electrostatic point charges can be modeled as creating an electrostatic field. For instance, a subset of the electrostatic point charges that correspond to the subset of the points in the point cloud 104 that neighbor the point of origin as identified by the neighborhood detection component 110 can be considered as contributing to the electrostatic field; however, the claimed subject matter is not so limited.

Further, the potential minimization component 112 computes a point of least electrostatic potential on a sphere centered at the point of origin as a function of the electrostatic point charges. The potential minimization component 112, for example, can compute the point of least electrostatic potential on the sphere centered at the point of origin as a function of the subset of the electrostatic point charges that correspond to the subset of the points in the point cloud 104 that neighbor the point of origin as identified by the neighborhood detection component 110. In various embodiments, the potential minimization component 112 can iteratively compute the point of least electrostatic potential on the sphere centered at the point of origin. In other embodiments, it is contemplated that the potential minimization component 112 need not iteratively compute the point of least electrostatic potential on the sphere, and instead, can employ a closed form solution to compute the point of least electrostatic potential on the sphere. Moreover, the potential minimization component 112 can assign a unit vector with a direction from the point of origin to the point of least electrostatic potential on the sphere as a normal 114 for the point of origin.

Figure 2:
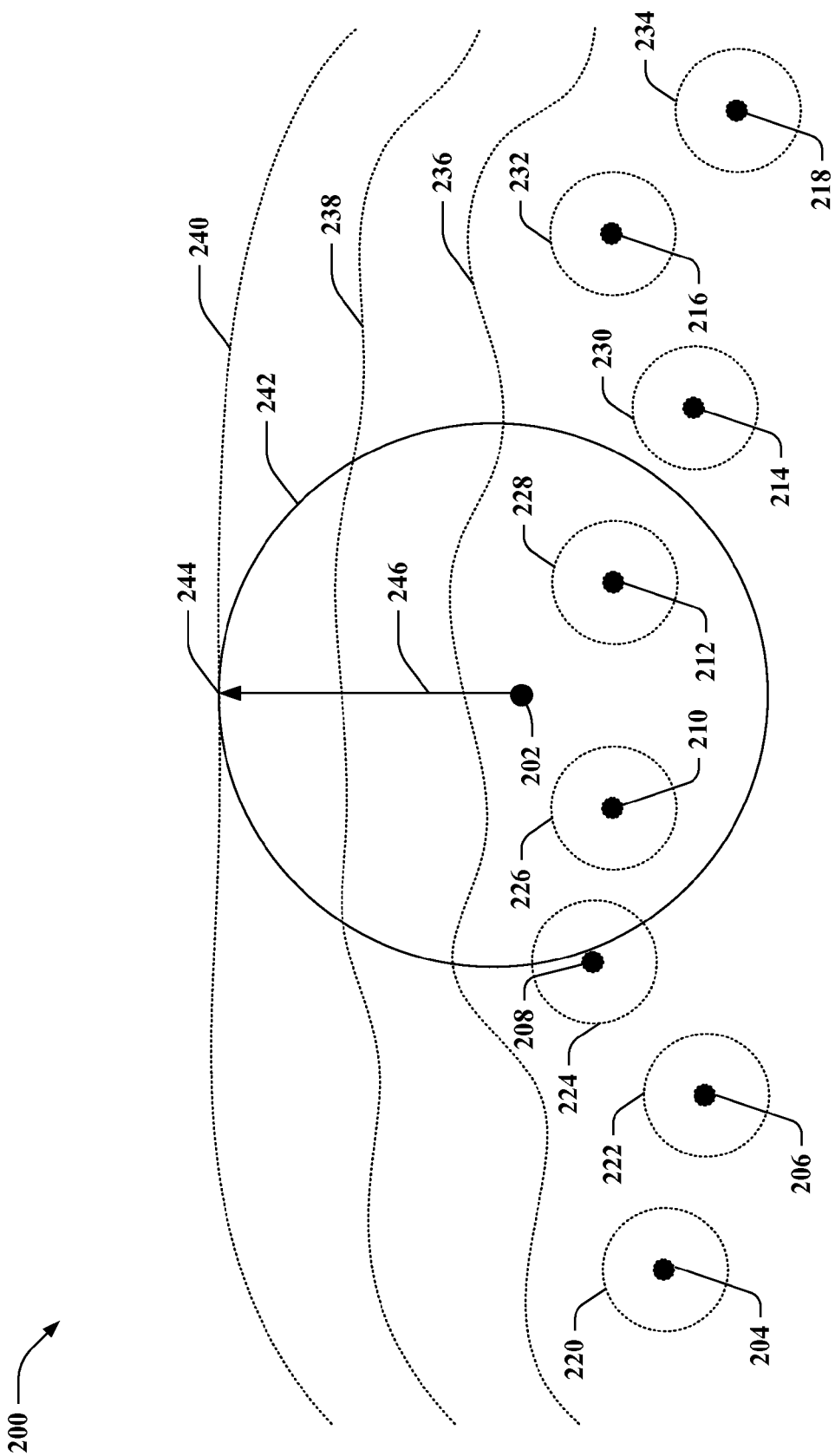
FIG. 2 illustrates an exemplary diagram of surfaces of equal potential.

Now turning to FIG. 2, illustrated is an exemplary diagram 200 of surfaces of equal potential. It is to be appreciated that the diagram 200 is provided as an example, and the claimed subject matter is not limited to such example. The diagram 200 includes a point of origin 202, which can be selected from a point cloud (e.g., the point cloud 104). The diagram 200 also includes eight neighbor points (e.g., the subset of the points in the point cloud that neighbor the point of origin 202). More particularly, the depicted example includes a neighbor point 204, a neighbor point 206, a neighbor point 208, a neighbor point 210, a neighbor point 212, a neighbor point 214, a neighbor point 216, and a neighbor point 218 (collectively referred to as neighbor points 204-218). It is contemplated, however, that the claimed subject matter is not limited to eight neighbor points 204-218; rather, substantially any number of points from the point cloud can be identified as neighboring the point of origin 202.

As set forth herein, the neighbor points 204-218 can be modeled as electrostatic point charges. Thus, electrostatic point charges can be considered to be located at the positions of the neighbor points 204-218. By way of example, the electrostatic point charges can have substantially similar values; yet, the claimed subject matter is not so limited (e.g., two or more of the electrostatic point charges located at the positions of the neighbor points 204-218 can have differing values).

An electrostatic field is induced by the electrostatic point charges located at the positions of the neighbor points 204-218. As depicted, the diagram 200 includes a plurality of equipotential surfaces, namely, an equipotential surface 220, an equipotential surface 222, an equipotential surface 224, an equipotential surface 226, an equipotential surface 228, an equipotential surface 230, an equipotential surface 232, an equipotential surface 234, an equipotential surface 236, an equipotential surface 238, and an equipotential surface 240 (collectively referred to herein as equipotential surfaces 220-240). The equipotential surfaces 220-240 are surfaces of constant scalar potential within the electrostatic field due to the electrostatic point charges located at the neighbor points 204-218. In the illustrated example, points on the equipotential surface 240 have a lower potential than points on the equipotential surface 238, points on the equipotential surface 238 have a lower potential than points on the equipotential surface 236, and points on the equipotential surface 236 have a lower potential than points on the equipotential surfaces 220-234.

Moreover, FIG. 2 shows a graphical overlay that represents computation of a normal for the point of origin 202. The graphical overlay includes a sphere 242 centered at the point of origin 202. A point of least electrostatic potential 244 on the sphere 242 centered at the point of origin 202 can be computed based on the electrostatic point charges positioned at the neighbor points 204-218. In the depicted example, the point of least electrostatic potential 244 is on a lower equipotential surface (e.g., the equipotential surface 240) than other points on the sphere 242, and thus, can be recognized as having a minimum electrostatic potential on the sphere 242. Moreover, a direction from the point of origin 202 to the point of least electrostatic potential 244 on the sphere 242 can be assigned as a direction of a normal 246 for the point of origin 202.

Figure 3:
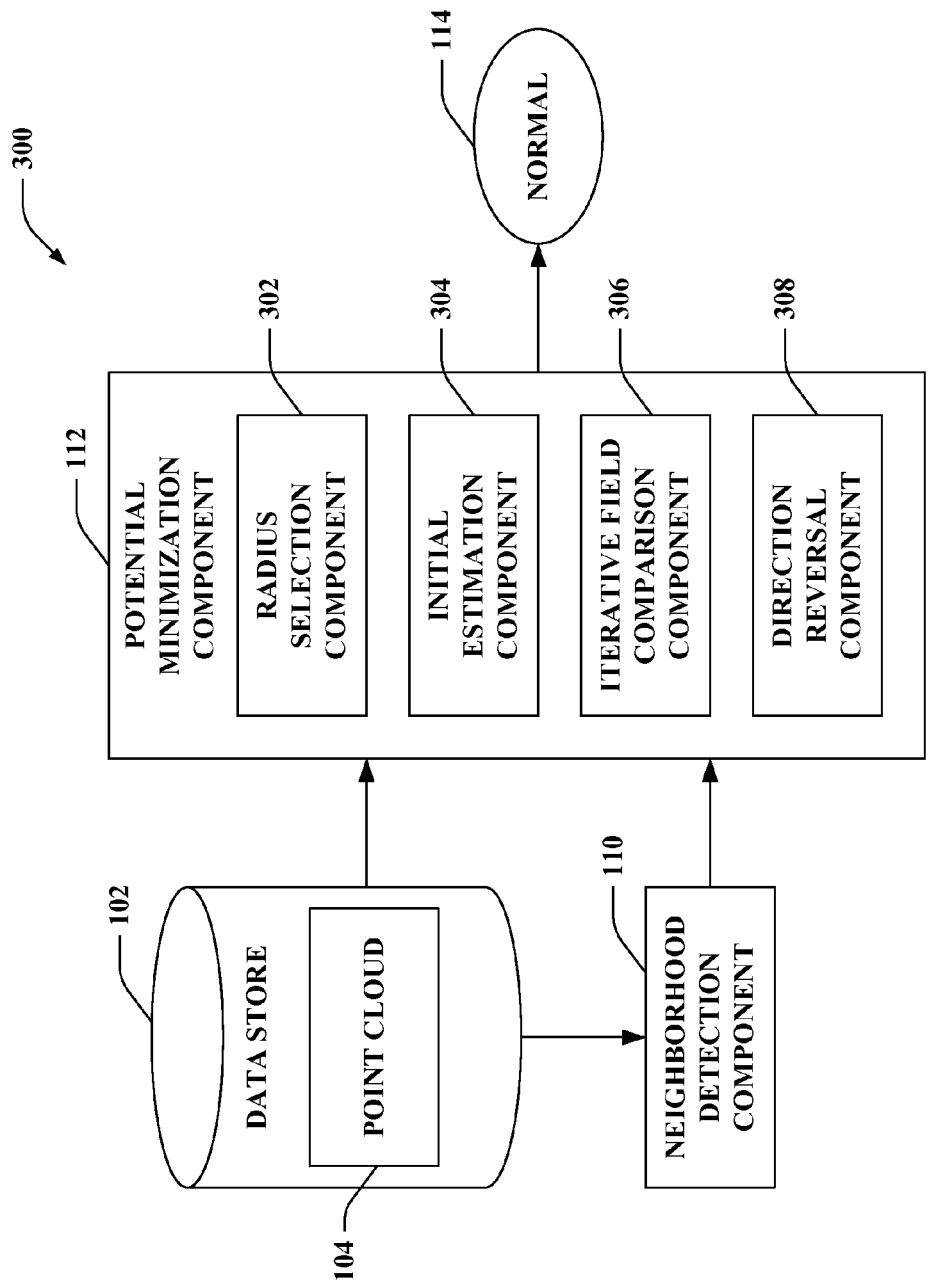
FIG. 3 illustrates a functional block diagram of an exemplary system that computes normals for points (e.g., points of origin) in the point cloud.

With reference to FIG. 3, illustrated is a system 300 that computes normals for points (e.g., points of origin) in the point cloud 104. The system 300 includes the data store 102, the neighborhood detection component 110, and the potential minimization component 112. The data store 102 can retain the point cloud 104. Points in the point cloud 104 can independently be set as a point of origin. For a point set as a point of origin, the neighborhood detection component 110 can identify a subset of the points in the point cloud 104 that neighbor the point of origin. The potential minimization component 112 can model the subset of points that neighbor the point of origin as electrostatic point charges. Further, the potential minimization component 112 can compute a point of least electrostatic potential on a sphere centered at the point of origin as a function of the electrostatic point charges that correspond to the subset of the points that neighbor the point of origin.

The potential minimization component 112 can include a radius selection component 302 that controls a length of a radius of the sphere centered at the point of origin. The length of the radius of the sphere can be set by the radius selection component 302 to control a tradeoff between noise reduction and feature preservation. For instance, increasing a length of the radius can result in increased noise reduction, while features may be lost. On the contrary, decreasing a length of the radius can provide increased feature preservation with less noise reduction.

In various embodiments, a length of the radius of the sphere centered at the point of origin can be predefined. Thus, the radius selection component 302 can set the length of the radius of the sphere to a predefined length. For instance, the radius selection component 302 can receive an input parameter that controls the predefined length; however, it is to be appreciated that the claimed subject matter is not so limited. In accordance with various examples, the same predefined length of the radius can be used by the radius selection component 302 when computing normals for each of the points in the point cloud 104; however, it is to be appreciated that the radius selection component 302 can employ differing predefined lengths for radiuses when computing normals for different points in the point cloud 104.

According to an example, the neighborhood detection component 110 can detect the subset of the points in the point cloud 104 positioned less than a predetermined distance from the point of origin. Further pursuant to this example, the radius selection component 302 can set the length of the radius of the sphere centered at the point of origin to a predefined length. By way of illustration, the predetermined distance used by the neighborhood detection component 110 can be two times the length of the radius of the sphere centered at the point of origin set by the radius selection component 302; however, it is to be appreciated that the claimed subject matter is not limited to the foregoing correlation between the predetermined distance and the length of the radius of the sphere.

In other embodiments, a length of the radius of the sphere centered at the point of origin can be determined by the radius selection component 302. The radius selection component 302 can determine a length of a radius that encloses a target number of points from the subset of the points in the point cloud 104 that neighbor the point of origin within the sphere centered at the point of origin. Pursuant to an example, the radius selection component 302 can select a length of a radius from the point of origin to create a sphere that encloses twenty points from the subset of points that neighbor the point of origin identified by the neighborhood detection component 110; yet, it is contemplated that the target number of points can be substantially any other number of points, and is not limited to being twenty points. Accordingly, the length of the radius determined by the radius selection component 302, and thus, the computation of the normal by the potential minimization component 112, can be locally adaptive to point density since the point cloud 104 can have a non-uniform distribution of points.

In various embodiments, the potential minimization component 112 can iteratively compute the point of least electrostatic potential on the sphere centered at the point of origin. The potential minimization component 112 further includes an initial estimation component 304 that can generate an initial estimate of the point of least electrostatic potential on the sphere centered at the point of origin. The initial estimation component 304 can generate an initial estimate as being perpendicular to a plane defined by the point of origin and two points in the point cloud 104 that neighbor the point of origin. According to an example, the initial estimation component 304 can compute cross products between a vector from a farthest neighbor point (e.g., point included in the subset of points that neighbor the point of origin that is farthest from the point of origin) to the point of origin and a vector from each remaining point in the subset of points that neighbor the point of origin to the point of origin. Following this example, the initial estimation component 304 can select a longest resulting cross product vector as an initial estimate of the normal, from which the initial estimate of the point of least electrostatic potential on the sphere can be identified.

Moreover, the potential minimization component 112 includes an iterative field comparison component 306 that can iteratively compare directions of radius vectors from the point of origin to directions of the electrostatic field due to the electrostatic point charges at respective points on the sphere centered at the point of origin. The iterative comparison can be performed by the iterative field comparison component 306 to compute the point of least electrostatic potential on the sphere centered at the point of origin. For instance, the iterative field comparison component 306 can compute a direction of the electrostatic field at a given point on the sphere centered at the point of origin based on the electrostatic point charges that correspond to the subset of the points in the point cloud 104 that neighbor the point of origin. Moreover, the point of least electrostatic potential on the sphere centered at the point of origin can be computed by the iterative field comparison component 306 as being a particular point on the sphere at which a corresponding direction of a radius vector from the point of origin to the particular point and a corresponding direction of the electrostatic field due to the electrostatic point charges at the particular point are substantially parallel.

According to an illustration, the iterative field comparison component 306 can begin with the initial estimate of the point of least electrostatic potential on the sphere identified by the initial estimation component 304. Thus, the iterative field comparison component 306 can initially compute a direction of the electrostatic field at the initial estimate of the point of least electrostatic potential on the sphere identified by the initial estimation component 304, and compare the computed direction of the electrostatic field to a direction of a radius vector (e.g., from the point of origin to the initial estimate of the point of least electrostatic potential on the sphere). If the direction of the electrostatic field and the direction of the radius vector are not substantially parallel at the initial estimate of the point of least electrostatic potential, then the iterative field comparison component 306 can select a next point on the sphere based on the direction of the electrostatic field at the initial estimate of the point of least electrostatic potential. Further, the iterative field comparison component 306 can again compute a direction of the electrostatic field at the next point on the sphere and compare the direction of the electrostatic field to a direction of a radius vector at the next point on the sphere. The foregoing can be repeated until the iterative field comparison component 306 computes a particular point on the sphere at which a corresponding direction of a radius vector from the point of origin to the particular point and a corresponding direction of the electrostatic field at the particular point are substantially parallel. Moreover, the potential minimization component 112 can assign the direction from the point of origin to the particular point on the sphere (e.g., the point of least electrostatic potential on the sphere) as the normal 114 for the point of origin.

In other embodiments, the potential minimization component 112 can alternatively employ a closed form solution to compute the point of least electrostatic potential on the sphere centered at the point of origin. Further, the potential minimization component 112 can assign the direction from the point of origin to the point of least electrostatic potential on the sphere as the normal 114 for the point of origin.

The potential minimization component 112 can further include a direction reversal component 308 that can identify whether the normal 114 for the point of origin is oriented towards a device (e.g., laser scanner, camera, etc.) from which the point of origin was observed. When the direction reversal component 308 identifies that the normal 114 is oriented towards the device from which the point of origin was observed, then the normal 114 can be maintained by the direction reversal component 308. Alternatively, when the direction reversal component 308 identified that the normal 114 is oriented away from the device from which the point of origin was observed, then the normal 114 can be flipped by the direction reversal component 308. Accordingly, the direction reversal component 308 can enable favoring a direction of a viewer (e.g., represented by a position of the device). Moreover, it is to be appreciated that the direction reversal component 308 can similarly evaluate and selectively flip an orientation of a vector outputted by the initial estimation component 304 and vectors outputted by the iterative field comparison component 306 after each iteration performed thereby.

According to an example, the direction reversal component 308 can compute a dot product of the normal 114 with a vector from the point of origin to a position of the device used to observe the point of origin. If the result of the dot product is negative, then the normal 114 can be flipped by 180 degrees by the direction reversal component 308. Alternatively, if the result of the dot product is positive, then the normal 114 can be maintained by the direction reversal component 308.

Figure 4:
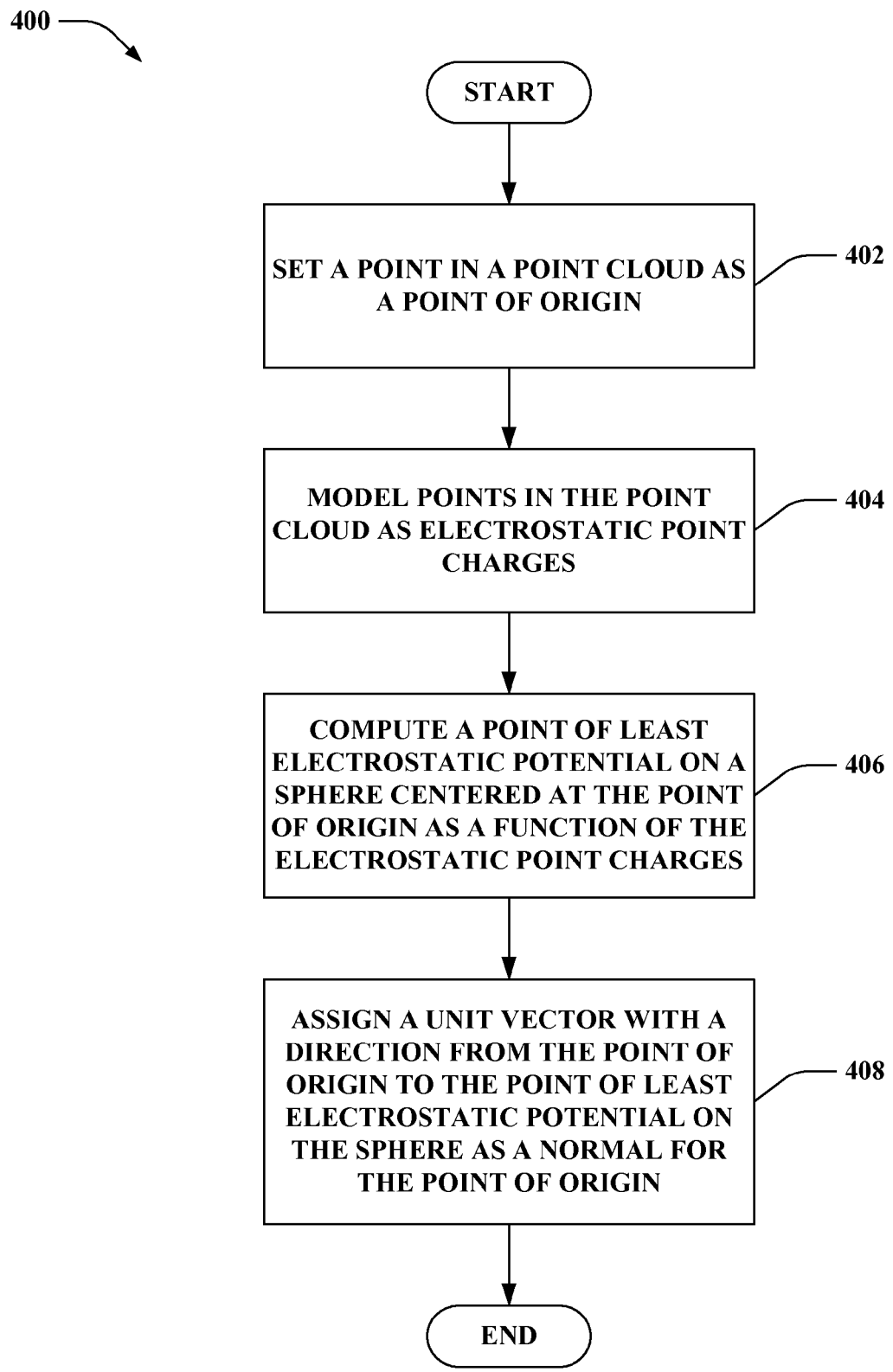
FIG. 4 is a flow diagram that illustrates an exemplary methodology of computing a surface normal.
Figure 5:
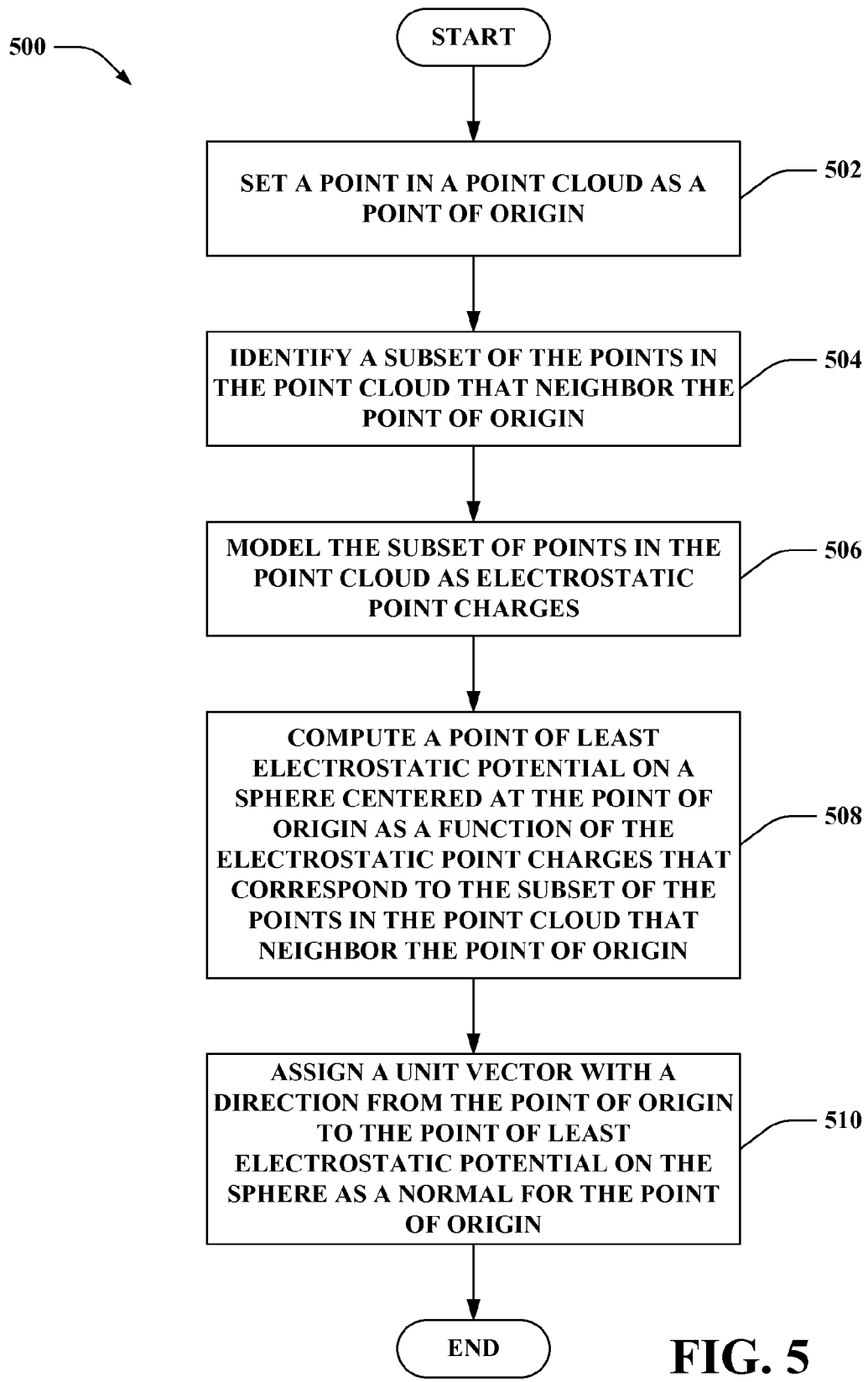
FIG. 5 is a flow diagram that illustrates an exemplary methodology of generating a surface normal for a point in a point cloud.
Figure 6:
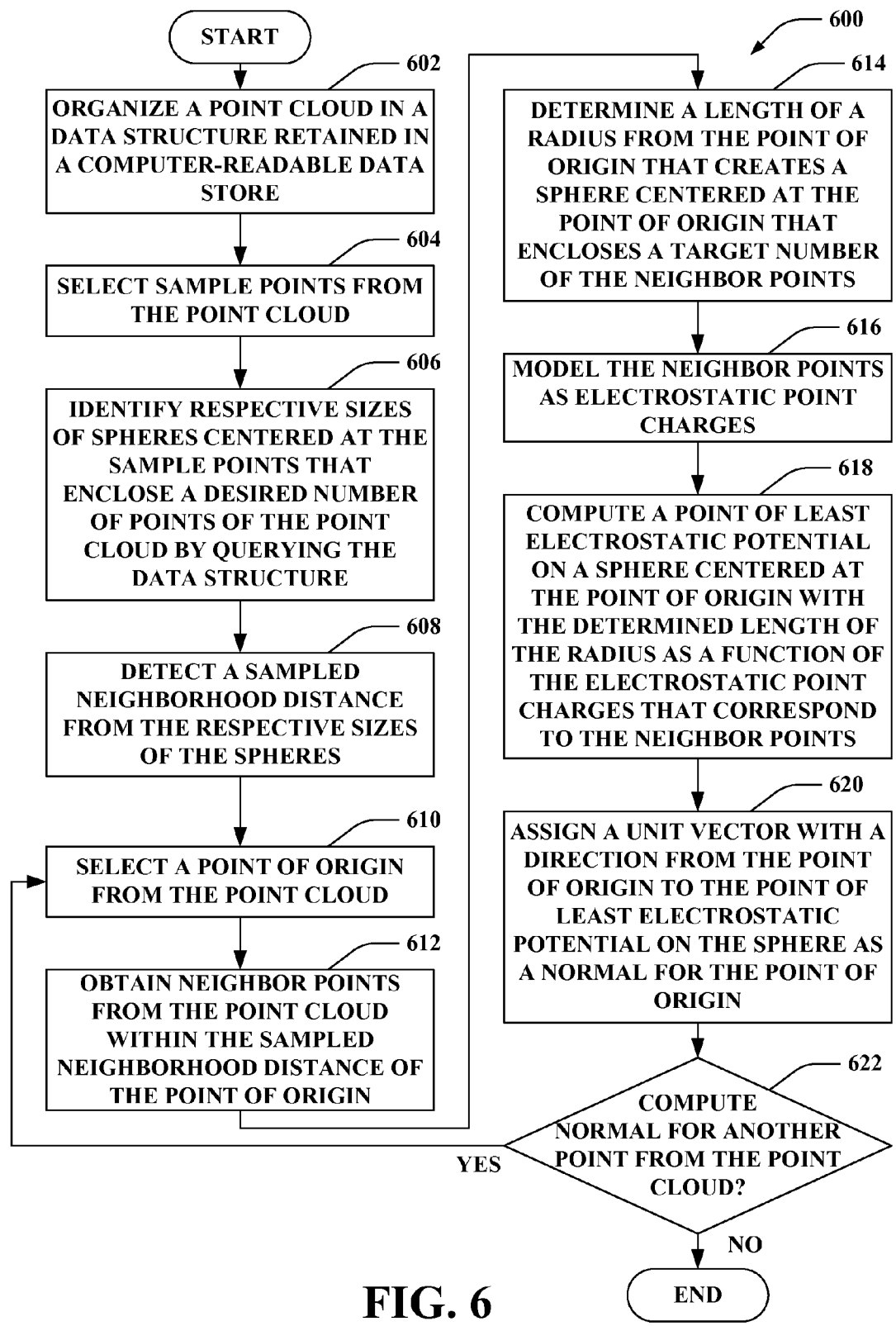
FIG. 6 is a flow diagram that illustrates an exemplary methodology of adaptively defining a radius of a sphere used for a normal computation based on an electrostatic potential analysis.

FIGS. 4-6 illustrate exemplary methodologies relating to computing surface normals for points in a point cloud. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 4 illustrates a methodology 400 of computing a surface normal. At 402, a point in a point cloud can be set as a point of origin. The point cloud, for instance, is representative of a measured surface of a physical object. Moreover, the point cloud can be retained in a computer-readable data store. At 404, points in the point cloud can be modeled as electrostatic point charges (e.g., the electrostatic point charges can be modeled as having substantially similar values, differing values, a combination thereof, etc.). At 406, a point of least electrostatic potential on a sphere centered at the point of origin can be computed as a function of the electrostatic point charges. At 408, a unit vector with a direction from the point of origin to the point of least electrostatic potential on the sphere can be assigned as a normal for the point of origin.

It is contemplated that respective normals can similarly be computed and assigned to other points in the point cloud. For example, a second point in the point cloud can be set as a second point of origin. A second point of least electrostatic potential on a second sphere centered at the second point of origin can be computed as a function of the electrostatic point charges. Further, a second unit vector with a direction from the second point of origin to the second point of least electrostatic potential on the second sphere can be assigned as a normal for the second point of origin.

Now referring to FIG. 5, illustrated is a methodology 500 of generating a surface normal for a point in a point cloud. At 502, a point in a point cloud can be set as a point of origin. At 504, a subset of the points in the point cloud that neighbor the point of origin can be identified. At 506, the subset of points in the point cloud can be modeled as electrostatic point charges. At 508, a point of least electrostatic potential on a sphere centered at the point of origin can be computed as a function of the electrostatic point charges that correspond to the subset of the points in the point cloud that neighbor the point of origin. At 510, a unit vector with a direction from the point of origin to the point of least electrostatic potential on the sphere can be assigned as a normal for the point of origin.

With reference to FIG. 6, illustrated is a methodology 600 of adaptively defining a radius of a sphere used for a normal computation based on an electrostatic potential analysis. At 602, a point cloud can be organized in a data structure retained in a computer-readable data store. At 604, sample points from the point cloud can be selected. At 606, respective sizes of spheres centered at the sample points that enclose a desired number of points of the point cloud can be identified by querying the data structure. For example, the desired number of points can be 100 points; yet, the claimed subject matter is not so limited. At 608, a sampled neighborhood distance can be detected from the respective sizes of the spheres. The sampled neighborhood distance can be a statistic based on the respective sizes of the spheres centered at the sample points that enclose the desired number of points. Thereafter, the sampled neighborhood distance can be used to independently compute a respective normal for the points in the point cloud.

At 610, a point of origin can be selected from the point cloud. At 612, neighbor points from the point cloud within the sampled neighborhood distance of the point of origin can be obtained. For instance, a query of the data structure using the sampled neighborhood distance as a parameter can be used to obtain the neighbor points. Such query can return approximately the desired number of points on average, but depends on local point density within the point cloud. Moreover, a neighbor point that is farthest from the point of origin can be detected, for example. Further, a histogram of neighbor point distances between the point of origin and the neighbor points can be built.

According to another example, an initial estimate of a normal for the point of origin can be generated. Following this example, cross products between a vector from the farthest normal to the point of origin and vectors from each remaining neighbor point in turn to the point of origin can be computed. Further, a longest resulting cross product vector can be identified as the initial estimate of the normal for the point of origin. Moreover, if the initial estimate of the normal is pointing away from a device from which the point of origin was observed, then the initial estimate of the normal can be flipped to point towards such device.

At 614, a length of a radius from the point of origin that creates a sphere centered at the point of origin that encloses a target number of the neighbor points can be determined. For instance, the histogram of the neighbor point distances can be used to determine the length of the radius. By way of example, the target number of the neighbor points can be twenty points; yet, it is to be appreciated that the claimed subject matter is not so limited.

At 616, the neighbor points can be modeled as electrostatic point charges. At 618, a point of least electrostatic potential on a sphere centered at the point of origin with the determined length of the radius can be computed as a function of the electrostatic point charges that correspond to the neighbor points. The point of least electrostatic potential can be iteratively computed. For example, an electrostatic potential at a point on the sphere that corresponds to the initial estimate of the normal for the point of origin can initially be evaluated. Moreover, after each iteration, a direction of the normal can potentially be flipped by 180 degrees if pointed away from the device that observes the point of origin. At 620, a unit vector with a direction from the point of origin to the point of least electrostatic potential on the sphere can be assigned as a normal for the point of origin.

At 622, it can be determined whether a normal is to be computed for another point in the point cloud. If a normal is to be computed for another point from the point cloud, then the methodology 600 returns to 610. At 610, a point from the point cloud for which a respective normal has yet to be computed can be selected as a point of origin. Otherwise, if it is determined that normals have been computed for each point in the point cloud (or a subset of points in the point cloud for which respective normals are to be computed) at 622, then the methodology 600 ends.

Figure 7:
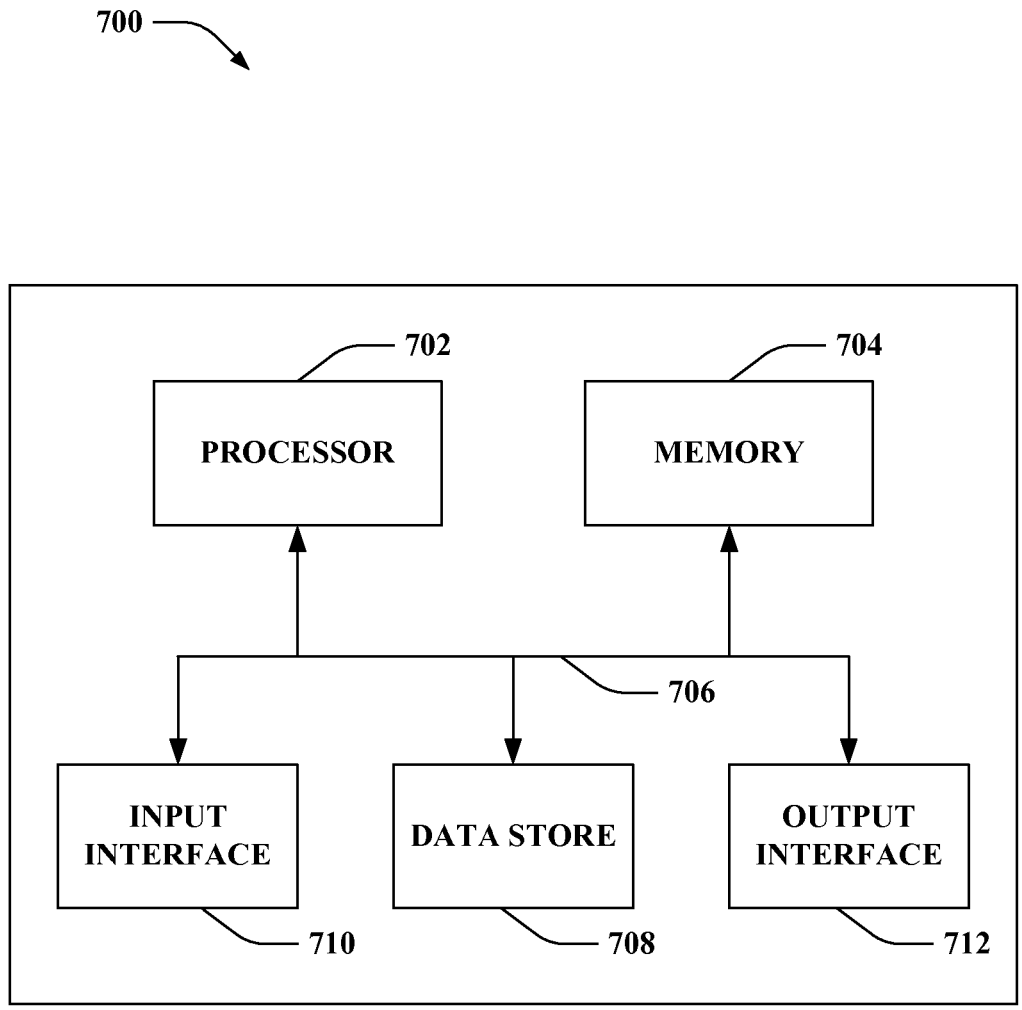
FIG. 7 illustrates an exemplary computing device.

Referring now to FIG. 7, a high-level illustration of an exemplary computing device 700 that can be used in accordance with the systems and methodologies disclosed herein is illustrated. For instance, the computing device 700 may be used in a system that computes surface normals for points in a point cloud. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store a point cloud, a data structure that includes the point cloud, data related to neighbor points, electrostatic field related data, and so forth.

The computing device 700 additionally includes a data store 708 that is accessible by the processor 702 by way of the system bus 706. The data store 708 may include executable instructions, a point cloud, a data structure that includes the point cloud, data related to neighbor points, electrostatic field related data, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of computing a surface normal, the method executed by at least one processor of a computing device, the method comprising:
   setting a point in a point cloud as a point of origin, wherein the point cloud is representative of a measured surface of a physical object;
   modeling points in the point cloud as electrostatic point charges;
   computing a point of least electrostatic potential on a sphere centered at the point of origin as a function of the electrostatic point charges; and
   assigning a unit vector with a direction from the point of origin to the point of least electrostatic potential on the sphere as a normal for the point of origin.

2. The method of claim 1, wherein a length of a radius of the sphere centered at the point of origin is predefined.

3. The method of claim 1, further comprising:
identifying a subset of the points in the point cloud that neighbor the point of origin; and
computing the point of least electrostatic potential on the sphere centered at the point of origin as a function of a subset of the electrostatic point charges that correspond to the subset of the points in the point cloud that neighbor the point of origin.

4. The method of claim 3, wherein identifying the subset of the points in the point cloud that neighbor the point of origin further comprises detecting the subset of the points in the point cloud positioned less than a predetermined distance from the point of origin.

5. The method of claim 4, wherein the predetermined distance is two times a length of a radius of the sphere centered at the point of origin.

6. The method of claim 3, wherein identifying the subset of the points in the point cloud that neighbor the point of origin further comprises detecting an approximate number of points in the point cloud positioned less than a sampled neighborhood distance from the point of origin, wherein the sampled neighborhood distance is determined from statistics of the point cloud.

7. The method of claim 3, further comprising determining a length of a radius of the sphere centered at the point of origin that encloses a target number of points from the subset of the points in the point cloud that neighbor the point of origin within the sphere centered at the point of origin.

8. The method of claim 3, further comprising:
organizing the point cloud in a data structure amenable to location-based searches and retained in a computer-readable data store of a computing device; and
identifying the subset of the points in the point cloud that neighbor the point of origin using the data structure retained in the computer-readable data store.

9. The method of claim 8, wherein the data structure is one of a binary space partitioning tree, a spatial data partitioning tree, or a spatial hash.

10. The method of claim 1, further comprising iteratively comparing directions of radius vectors from the point of origin to directions of an electrostatic field due to the electrostatic point charges at respective points on the sphere centered at the point of origin to compute the point of least electrostatic potential on the sphere centered at the point of origin.

11. The method of claim 10, wherein the point of least electrostatic potential on the sphere centered at the point of origin is computed as being a particular point on the sphere at which a corresponding direction of a radius vector from the point of origin to the particular point and a corresponding direction of the electrostatic field due to the electrostatic point charges at the particular point are substantially parallel.

12. The method of claim 10, further comprising generating an initial estimate of the point of least electrostatic potential on the sphere centered at the point of origin as being perpendicular to a plane defined by the point of origin and two points in the point cloud that neighbor the point of origin.

13. The method of claim 1, further comprising:
setting a second point in the point cloud as a second point of origin;
computing a second point of least electrostatic potential on a second sphere centered at the second point of origin as a function of the electrostatic point charges; and
assigning a second unit vector with a direction from the second point of origin to the second point of least electrostatic potential on the second sphere as a normal for the second point of origin.

14. The method of claim 1, further comprising:
identifying whether the normal is oriented towards a device from which the point of origin was observed;
maintaining the normal when identified as being oriented towards the device from which the point of origin was observed; and
flipping the normal when identified as being oriented away from the device from which the point of origin was observed.

15. A system that computes surface normals based on an electrostatic potential analysis, comprising:
at least one processor and
memory that comprises components that are executable by the at least one processor, the components comprising:
a point selection component that sets a point in a point cloud as a point of origin, wherein the point cloud is representative of a measured surface of a physical object, and wherein the point cloud is retained in a computer-readable data store; and
a potential minimization component that models points in the point cloud as electrostatic point charges, computes a point of least electrostatic potential on a sphere centered at the point of origin as a function of the electrostatic point charges, and assigns a unit vector with a direction from the point of origin to the point of least electrostatic potential on the sphere as a normal for the point of origin.

16. The system of claim 15, the components further comprising a neighborhood detection component that identifies a subset of the points in the point cloud that neighbor the point of origin set by the point selection component, wherein the potential minimization component computes the point of least electrostatic potential on the sphere centered at the point of origin as a function of a subset of the electrostatic point charges that correspond to the subset of the points in the point cloud that neighbor the point of origin.

17. The system of claim 16, the components further comprising a radius selection component that determines a length of a radius of the sphere centered at the point of origin that encloses a target number of points from the subset of the points in the point cloud that neighbor the point of origin.

18. The system of claim 15, the components further comprising:
an initial estimation component that generates an initial estimate of the point of least electrostatic potential on the sphere centered at the point of origin as a function of the point of origin and two points in the point cloud that neighbor the point of origin; and
an iterative field comparison component that iteratively compares directions of radius vectors from the point of origin to directions of an electrostatic field due to the electrostatic point charges at respective points on the sphere centered at the point of origin beginning with the initial estimate of the point of least electrostatic potential to compute the point of least electrostatic potential on the sphere centered at the point of origin.

19. The system of claim 15, the components further comprising a direction reversal component that evaluates whether the normal for the point of origin is oriented towards a device from which the point of origin was observed and selectively flips the normal when oriented away from the device.

20. A computer-readable storage medium including computer-executable instructions that, when executed by a processor, cause the processor to perform acts including:
setting a point in a point cloud as a point of origin, wherein the point cloud is representative of a measured surface of a physical object;

identifying a subset of the points in the point cloud that neighbor the point of origin;

modeling the subset of points in the point cloud as electrostatic point charges;

computing a point of least electrostatic potential on a sphere centered at the point of origin as a function of the electrostatic point charges that correspond to the subset of the points in the point cloud that neighbor the point of origin; and assigning a unit vector with a direction from the point of origin to the point of least electrostatic potential on the sphere as a normal for the point of origin.

* * * * *